(12) United States Patent
Louie

(10) Patent No.: US 11,591,064 B2
(45) Date of Patent: Feb. 28, 2023

(54) PACKABLE MODULAR QUADCOPTER

(71) Applicant: Jennifer Lai-Jhing Louie, Fredericksburg, VA (US)

(72) Inventor: Jennifer Lai-Jhing Louie, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 426 days.

(21) Appl. No.: 16/724,478

(22) Filed: Dec. 23, 2019

(65) Prior Publication Data

US 2021/0188420 A1 Jun. 24, 2021

(51) Int. Cl.
*B64C 1/30* (2006.01)
*B64C 39/02* (2023.01)

(52) U.S. Cl.
CPC .............. *B64C 1/30* (2013.01); *B64C 39/024* (2013.01); *B64C 2201/108* (2013.01)

(58) Field of Classification Search
CPC ............ B64C 39/024; B64C 2201/108; B64C 2201/203; B64C 1/30
See application file for complete search history.

(56) References Cited

U.S. PATENT DOCUMENTS

| 11,042,166 | B2 * | 6/2021 | Ohta ...................... B64C 27/006 |
| 2015/0259066 | A1 * | 9/2015 | Johannesson ........... B64C 27/08 244/17.27 |
| 2017/0225782 | A1 * | 8/2017 | Kohstall ................. B64C 1/063 |
| 2018/0312253 | A1 * | 11/2018 | Zhao ....................... B64C 27/08 |
| 2021/0354812 | A1 * | 11/2021 | Patterson ................. B64C 1/30 |

FOREIGN PATENT DOCUMENTS

| CN | 106240824 A | * | 12/2016 | |
| CN | 108545170 A | * | 9/2018 | ............... B64C 1/30 |

* cited by examiner

*Primary Examiner* — Christopher D Hutchens
(74) *Attorney, Agent, or Firm* — Gerhard W. Thielman

(57) ABSTRACT

A modular quadcopter is provided for vertical flight. The quadcopter includes a housing, a quadrilateral set of extensions, and a quadrilateral set of arms. The housing contains flight control and sensor equipment, and has a relative vertical orientation. The housing is configurable for either stowage or deployment. The extensions are disposed on each corner of the housing. Each extension has a hinge that pitches outward and upward. Each arm is disposed on the hinge and contains an electric motor and a speed controller. The configurable below the housing for the stowage and extends radially from respective the extension in relation to the orientation for the deployment.

3 Claims, 5 Drawing Sheets

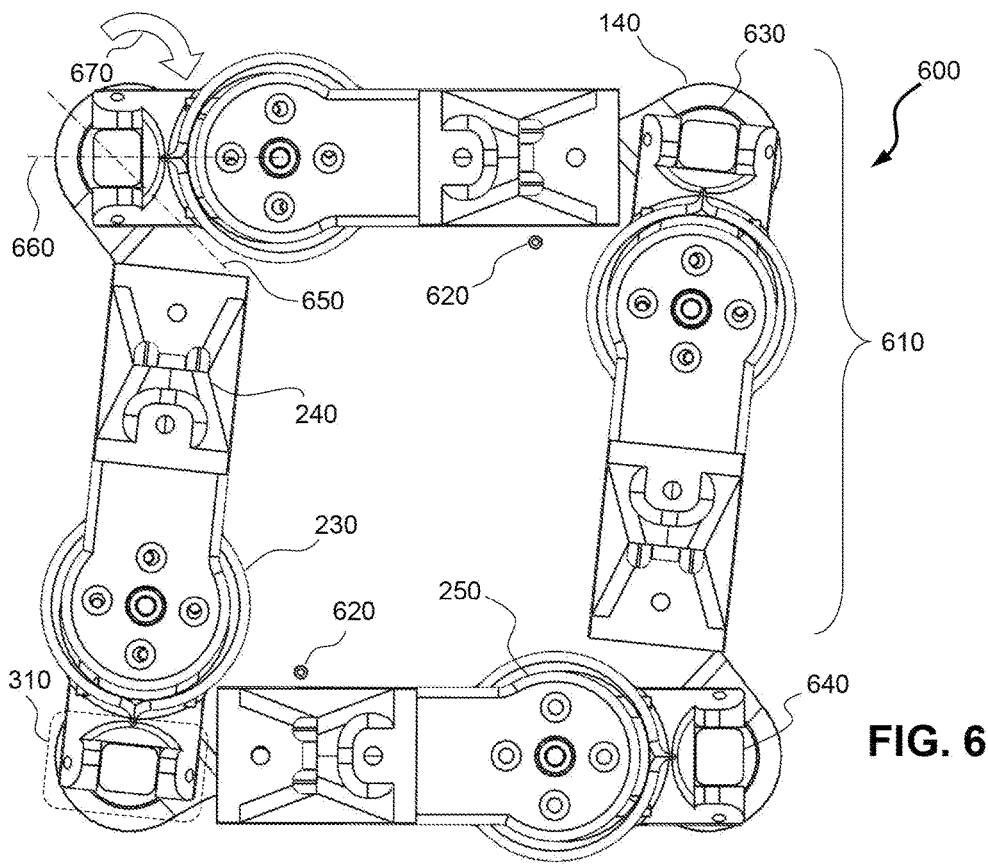
FIG. 6
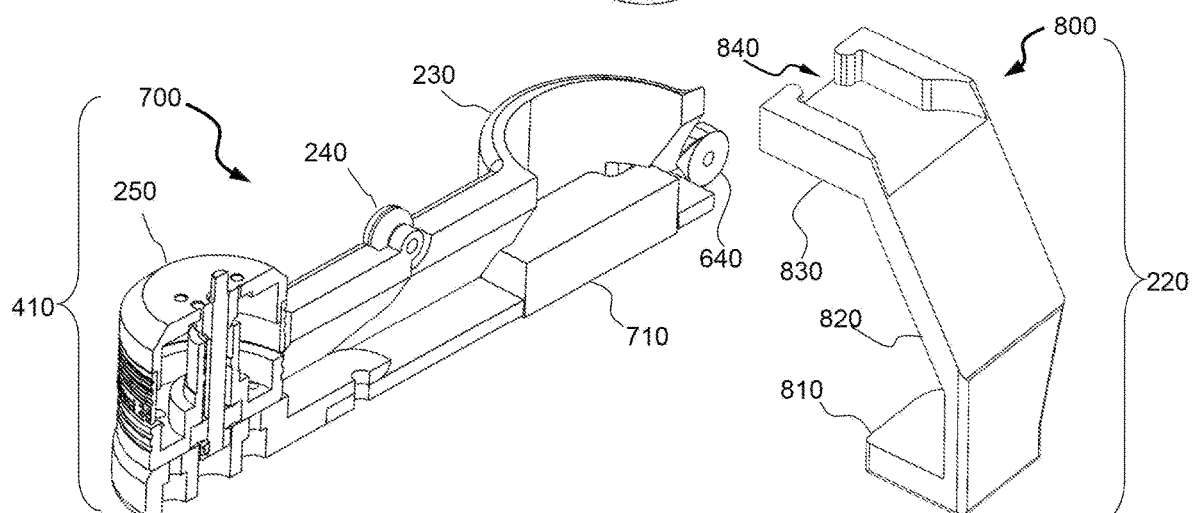
FIG. 7
FIG. 8

PACKABLE MODULAR QUADCOPTER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to quadcopters. In particular, the invention relates to a configurable unmanned aerial vehicle (UAV) that can be folded for stowage.

UAVs have become popular in the past few years, and many of them have been designed to be foldable. Many of the foldable UAV designs are intended to insert into backpacks. Most UAVs have the arms fold up beside or around the body compromising mission flexibility.

SUMMARY

Conventional quadcopters yield disadvantages addressed by various exemplary embodiments of the present invention. In particular, various exemplary embodiments provide a modular quadcopter for vertical flight. The quadcopter includes a housing with vertical orientation, a quadrilateral set of extensions, and a quadrilateral set of arms. The housing contains flight control and sensor equipment. The housing is configurable for either stowage or deployment. The extensions are disposed on each corner of the housing. Each extension has a hinge that pitches outward and upward. Each arm is disposed on the hinge and contains an electric motor and a speed controller.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 6 is a plan view of a set of arms of the quadcopter;

FIG. 7 is an isometric cutaway view of an arm; and

FIG. 8 is an isometric view of a leg.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Exemplary embodiments provide a packable unmanned aerial vehicle (UAV) that can be placed in a backpack and taken out into the field. It is important for a UAV to be easily transported from one location to another. This specific quadcopter folds up to a footprint about half the size of its deployed footprint. Its design provides flight in two different orientations enabling the quadcopter to carry two payloads at the same time. It can be flown in its upright position to carry out a first mission and then after returning, flipped to its other position and execute a second mission in a few minutes. Another payload may then replace the first payload, facilitating multiple sorties in quick succession.

Figure 1:
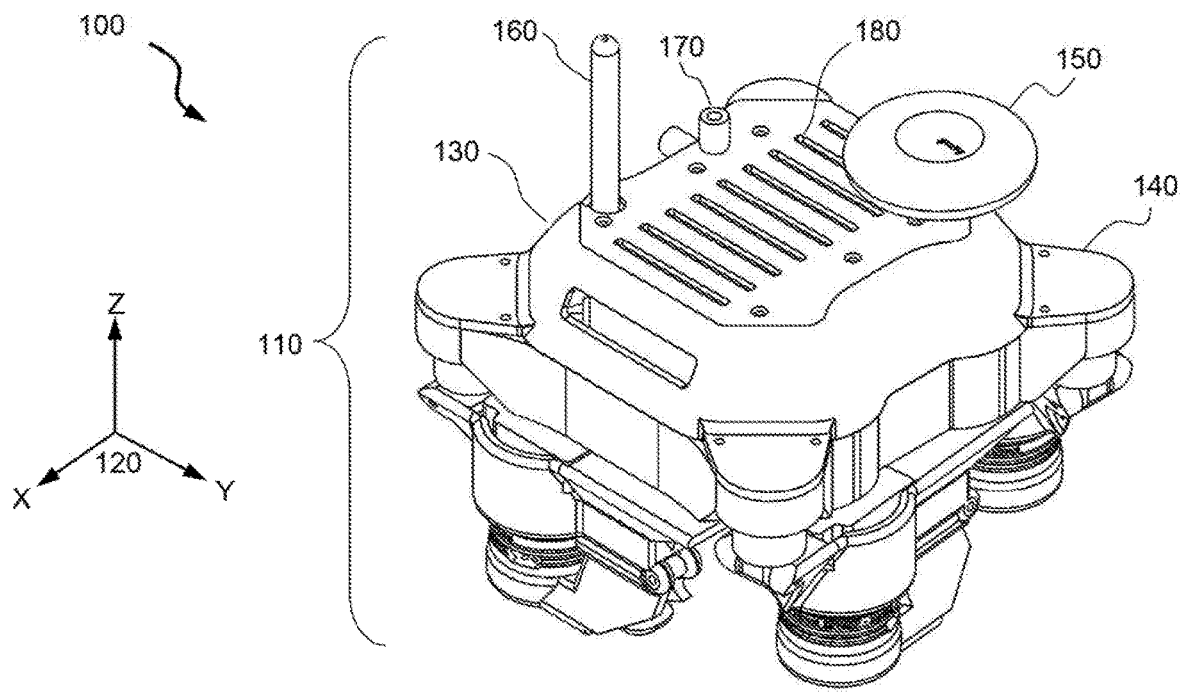
FIG. 1 is an isometric view of an exemplary quadcopter in folded configuration.

FIG. 1 shows an isometric view 100 of an exemplary packable quadcopter 110 in stowed configuration. A compass rose 120 shows three-dimensional Cartesian directions (X, Y and Z) to illustrate orientation. Vertical flight constitutes translation in the Z-direction. A package UAV housing 130 contains a flight controller, an electronic speed control, a signal receiver, and any additional sensors needed for operation. Four knobular extensions 140 are disposed in cruciform configuration at the corners of the housing 130. A dome antenna 150, a telemetry antenna 160 and a receiver antenna 170 are disposed at the top of the housing 130, along with convection ventilation slots 180 for thermal dissipation.

Figure 2:
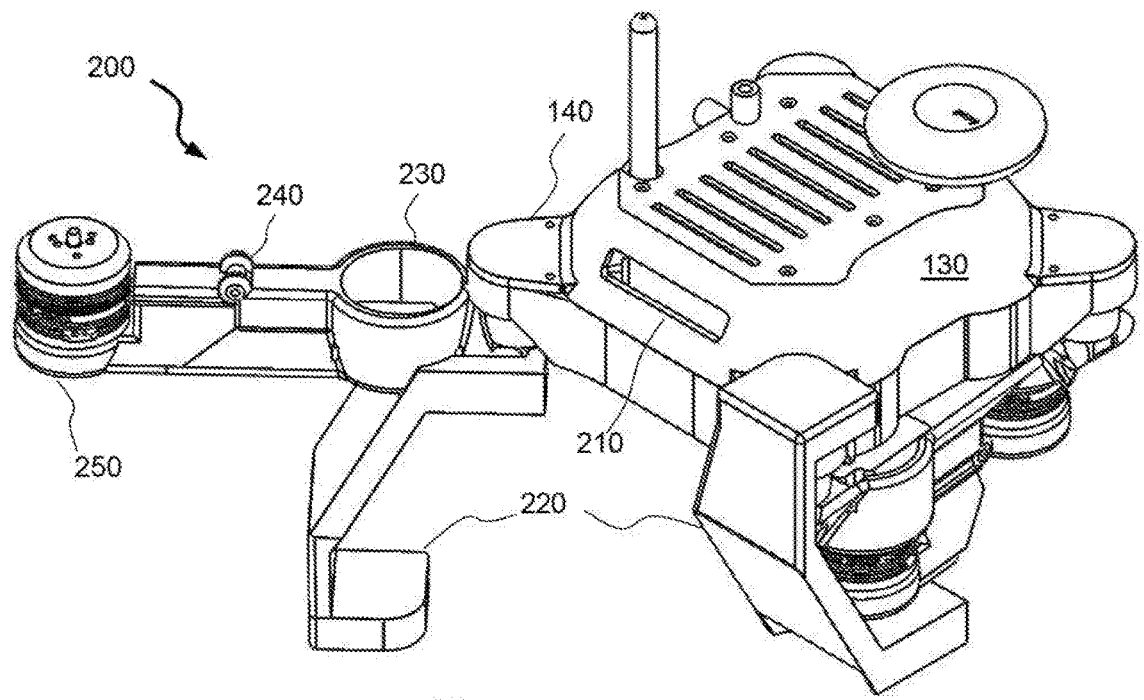
FIG. 2 is an isometric view of the quadcopter partly unfolded.

FIG. 2 shows an isometric view 200 of the packable quadcopter 110 with one extension 140 unfurled. A sensor slot 210 for easy cable access to a camera or additional sensor provides a forward window for the housing 130. Numbering of the corners on the housing 130 follows convention with the proximal extension 140 to the left of the slot 210 being first and sequencing clockwise. Thus, the second is the extension 140 to the right of the slot 210 (farthest left in views 100 and 200) and adjacent the telemetry antenna 160. Continuing, the third is the distal extension 140, and the fourth is the extension 140 adjacent the dome antenna 150 (farthest right in views 100 and 200).

A leg 220 protrudes underneath each extension 140. For the second extension 140, an unfurled circular cavity 230 extends radially beyond the extension 140, attaching to an elbow 240 that unfolds a brushless electric motor 250 used to turn a two-bladed propeller (not shown). The elbow 240 has a lateral axis orthogonal to the axial (i.e., vertical) direction. The leg 220 for the first extension 140 is furled upwards, unfurled downward and outward below the second extension 140, and omitted from view 200 for the third and fourth extensions 140. To ensure neutral angular momentum, the motors 250 turn clockwise for the first and third extensions 140 and anti-clockwise for the second and fourth extensions 140.

Figure 3:
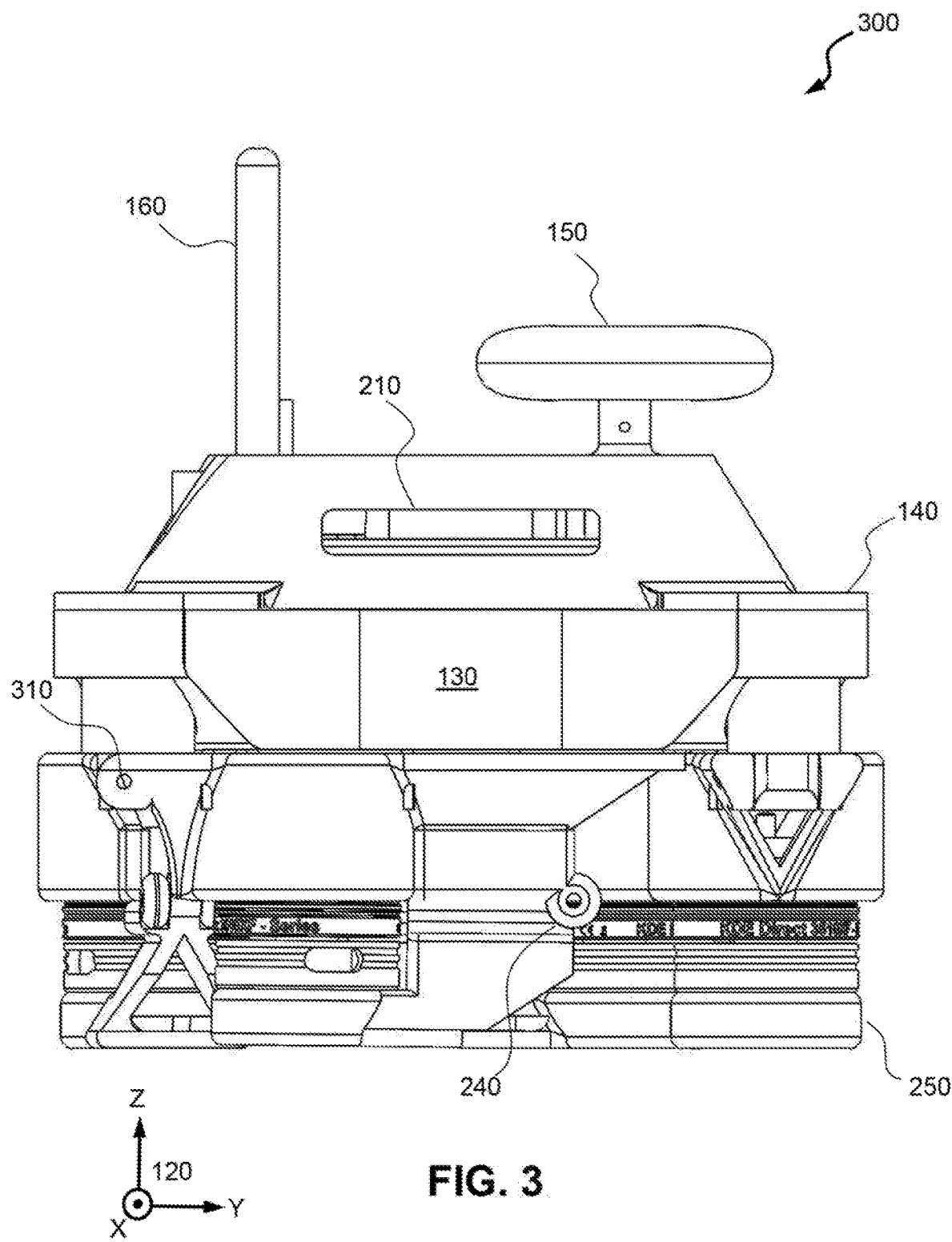
FIG. 3 is an elevation view of the quadcopter.

FIG. 3 shows an elevation view 300 of the quadcopter 110 as stowed as viewed from the front featuring the window slot 210. Each extension 140 includes a corresponding dual-axes hinge 310 underneath. These axes enable axial pivoting at the extension 140 and lateral rotation therefrom. The housing 130 can contain a variety of flight controller and sensor configurations, depending on tasks and missions. These options are independent of the exemplary quadcopter 110.

Figure 4A:
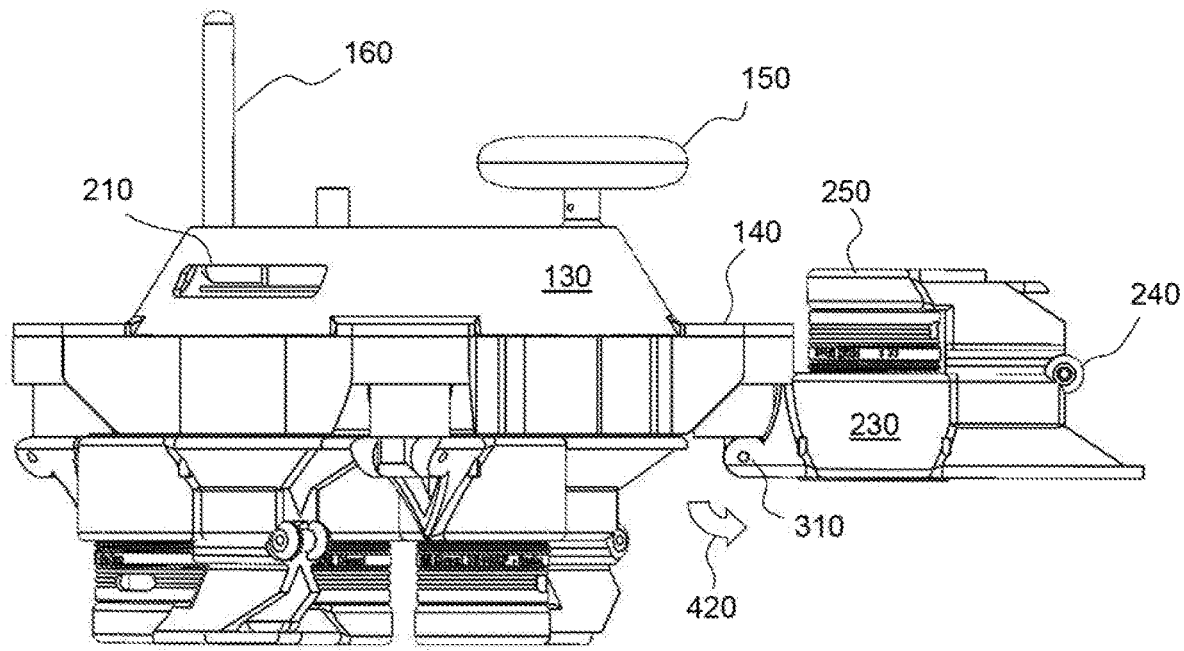
FIGS. 4A and 4B are elevation views of the quadcopter.
Figure 4B:
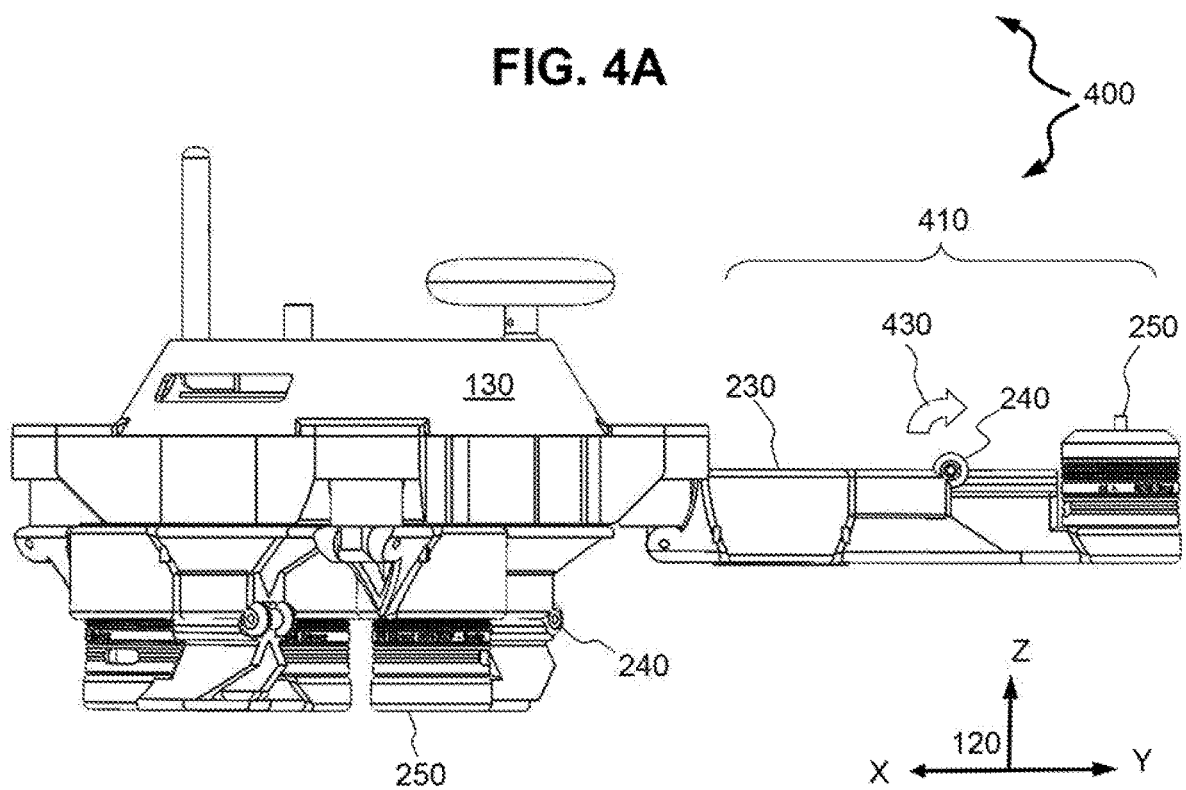

FIGS. 4A and 4B show elevation views 400 of the quadcopter 110 with an arm 410 respectively as partially and fully extended. The legs 220 are omitted in views 400. The hinge 310 connects the arm 410 to the extension 140. The arm 410 pivots on the hinge 310 along pitch arrow 420 radially outward and vertically upward from the extension 140 as shown in FIG. 4A with the motor 250 atop the cavity 230 that contains a speed controller (see FIG. 7). The corresponding leg 220 can attach either beneath the hinge 310 after unfurling the arm 410, or at the motor 250 nestled in the cavity 230 after folding the arm 410.

The arm 410 unfurls radially outward and vertically downward along pitch arrow 430 pivoting on the elbow 240 as shown in FIG. 4B with the motor 250 disposed radially away from the housing 130. Electrically conductive wires run inside the arm 410 from the motor 250 past the elbow 240 and are soldered to wires of the speed controller in the cavity 230. The wires continue along the arm 410 into the housing 130 to be soldered to the flight controller therein. The motors 250 and controllers constitute generic components in the context of exemplary embodiments.

Figure 5:
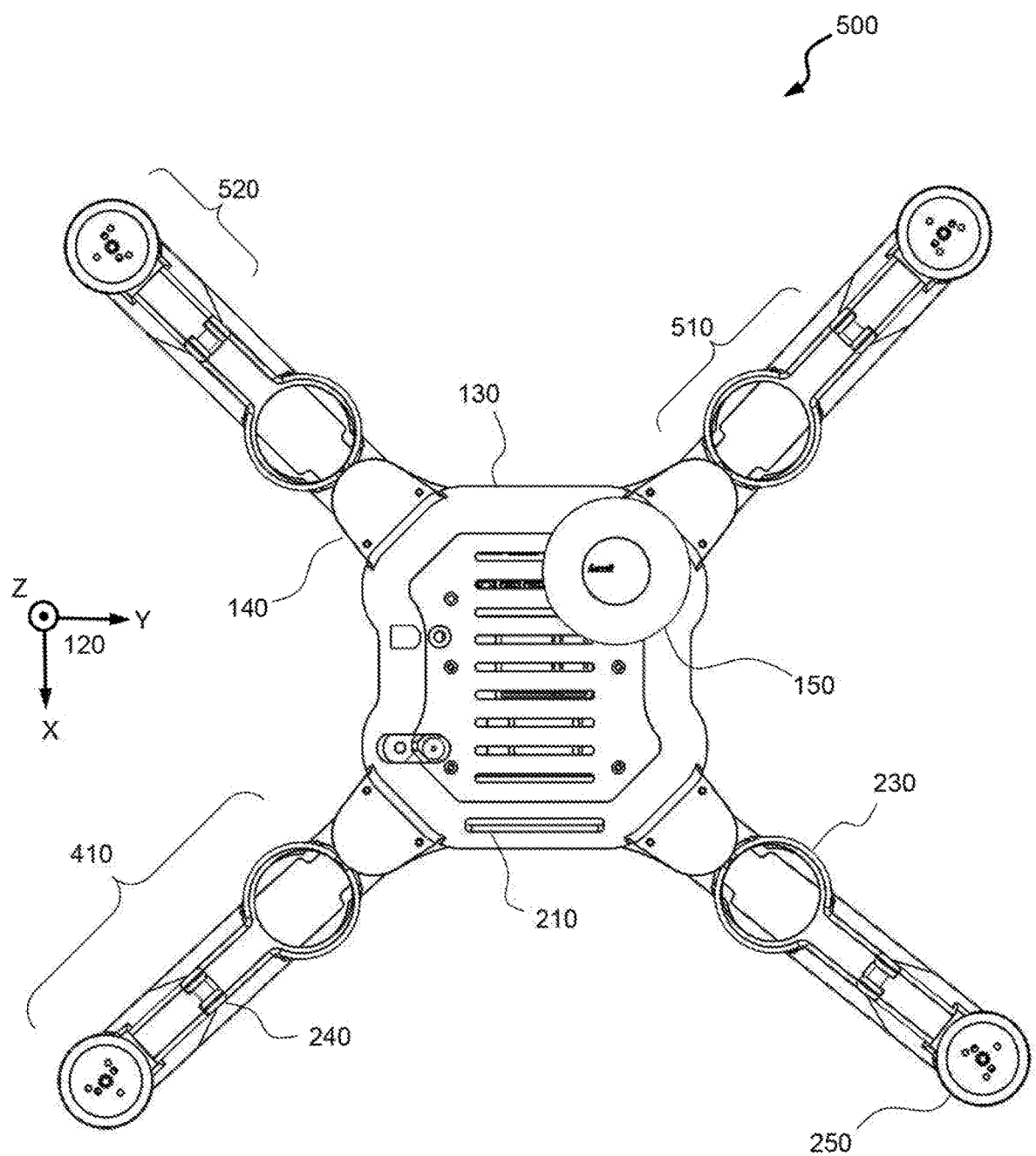
FIG. 5 is a plan view of the quadcopter as unfolded.

FIG. 5 shows a plan view 500 of the quadcopter 110 as unfurled from the top of the housing 130, with all arms 410 extending fully to enable the motor 250 to turn rotary blades (not shown) without mutual interference. The arms 410 comprise a proximal portion 510 that contains the cavity 230 joining at the elbow 240 to a distal portion 520 that includes the motor 250. FIG. 6 shows a plan view 600 arm components as separate assemblies 610 in folded configuration from below the bottom of the housing 130. The elbow 240 is folded to dispose the motor 250 coaxially within the cavity 230. The hinge 310 pivotably connects the arm 410 to the extension 140 on the housing 130. This axial (i.e., vertical) pivot enables the folded arm 410 to swing from radially outward from the extension 140 to laterally alongside the bottom of the housing 130. A pair of screw holes 620 on the underside of the housing 130 aid in securing the arms 410 for stowage. The dual-axes hinge 310 includes a pitch joint 630 and a swing joint 640. For clarity, a diagonal body line 650 extends from the center of the housing 130 to the extension 140, and an arm-furl line 660 extends from the hinge 310 to the proximal portion 510 of the arm 410 under stowage. The pitch joint 630 rotates the arm 410 for deployment along the pitch arrow 420 (see FIG. 4). By contrast, the swing joint 640 folds the arm 410 by pivoting the proximal portion 510 along yaw arrow 670 in the lateral X-Y plane from radially extending along the body line 650 to laterally repositioning adjacent the housing 130 along the furl line 660.

FIG. 7 shows an isometric cross-section view 700 of the arm 410 exploiting the bilateral symmetry. A speed controller 710 is illustrated in cross-section within the cavity 230. The proximal portion 510 with the cavity 230 extends outward from the pitch joint 630. The elbow 240 extends outward from the cavity 230. The distal portion 520 with the motor 250 extends outward from the elbow 240. FIG. 8 shows an isometric view 800 of the leg 220. A foot pad 810 engages a landing surface after being rotated along the hinge 310 from over the extension 140. A support 820 elevates the housing 130 from the pad 810. A landing 830 attaches the leg 220 to the housing 130. A channel 840 on the landing 830 provides a joint attachment for the arm 410 while folded under the extension 140.

This quadcopter 110 is packable and can be folded up to a smaller size to fit into a bag. In its current design, the exemplary quadcopter 110 folds from a deployment footprint (in inches) of 16.5"×16.3" to a stowage footprint of 7.7"×7.9". The arms 410 are divided into proximal and distal components 510 and 520 to enable their folding into each other. The legs 220 of the quadcopter 110 are used to secure the arms 410 in position and preclude them from collapsing during flight.

Steps for Collapsing are as Follows:

1) Release a screw between the proximal and distal components of the arm 410.

2) Fold the distal component 520 with the motor 250 over the cavity 230.

3) Use the removed screw and secure the distal component 520 to the housing 130. Proximal components 510 insert into the bottom of the housing 130, such as by threaded screws into the hole 620.

4) The folded arm 410 can rotate around its Y-axis by arrow 420 and underneath the housing 130 of the quadcopter 110.

5) Once underneath the extension 140, the arm 410 can be screwed into the housing 130 matching up the screw hole 620.

6) Dispose legs 220 over the housing 130 to secure the arms 410 in position under the quadcopter 110.

7) Install screws to hold the legs 220 in position.

8) Reverse steps to unfurl the quadcopter 110 for flight operation.

In its current configuration, this quadcopter 110 can be flown right-side-up or upside-down. The elbow 240 used in the arm 410 can be rotated to enable the arms 410 to face in the needed direction. For carrying a payload on the bottom of the quadcopter 110, the arms 410 can be secured with the leg 220 so that the motors 250 are facing upwards and forcing air downwards. For carrying a payload on the top lid of the quadcopter 110, the arms 410 can be rotated 180° (or $\pi$ radians) and then secured with the legs 220.

Different motors 250 and speed controllers 710 can be used because the exemplary configuration can fit several separate combinations. A unique feature in the exemplary design is the ability for the joints to interchange. The arm 410 is divided two portions, the distal component 520 that holds the motor 250 and the proximal component 510 that contains the speed controller 710 in the cavity 230. With this arrangements, the elbows 240 can be interchanged to accommodate different motors 250 and different speed controller 710 combinations while connected to the same housing 130. This enables rapid switch replacement of the arms 410 and for adapting to different payloads.

Different thermoplastics can be used fabricate the UAV parts on a three-dimensional printer, such as PLA, Ultem, carbon fiber, etc. Other materials such as aluminum, composite, and similar materials can also be used to construct the quadcopter 110. The dimensions of the quadcopter 110 can be altered to accommodate the payload and mission. Because components for the motor 250 and the speed controller 710 of the arms 410 can be switched out, additional sections can be made to accommodate larger and smaller motors and speed controllers.

Thus, exemplary embodiments an be used in the field to carry out two missions back to back by just rotating the arms 180°, flipping the direction that the motor thrust is pushing. Because the motor and speed controller combination can be set by choosing different arm sections, the exemplary quadcopter 110 can be adapted to multiple different payloads.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A modular quadcopter for vertical flight, said quadcopter comprising:

a housing for containing flight control and sensor equipment, said housing having a relative vertical axis with a top and a bottom and a lateral plane orthogonal to said axis;

a quadrilateral set of extensions disposed on each corner of said housing, each extension having a hinge that includes a swing joint that pivots along said lateral plane, and a pitch joint that rotates radially outward and vertically upward; and a quadrilateral set of arms, each arm disposed on said corresponding extension and containing an electric motor, wherein each said arm includes a proximal segment that connects to said hinge of said corresponding extension, and a distal segment attaching to an elbow that attaches to said proximal segment, said proximal segment pivots on said swing joint into one of radially projecting beyond said corresponding extension as deployment and laterally folding alongside said housing as stowage, said elbow pitches said distal segment radially outward and vertically downward in relation to said orientation from said proximal segment for said deployment, said elbow pitches said distal segment vertically upward and radially inward to fold against said proximal segment for said stowage, and said distal segment contains said motor, and said proximal segment includes a receptacle to receive said motor for said stowage.

2. The quadcopter according to claim 1, further comprising a quadrilateral set of legs, each leg attaching to said housing against respective said extension and corresponding said arm for said stowage and underneath said hinge for said deployment.

3. The quadcopter according to claim 1, wherein said housing further includes an antenna extending from said top for receiving a signal.

* * * * *